(12) United States Patent
Narumi et al.

(10) Patent No.: US 6,510,025 B2
(45) Date of Patent: Jan. 21, 2003

(54) THIN FILM MAGNETIC HEAD INCLUDING A PROTRUSION STRUCTURE AND AN INSULATION FILM IN A MAGNETIC CORE

(75) Inventors: Shun-Ichi Narumi, Hitachi (JP); Hiroshi Fukui, Hitachi (JP); Moriaki Fuyama, Hitachi (JP); Matahiro Komuro, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/964,814

(22) Filed: Sep. 28, 2001

(65) Prior Publication Data

US 2002/0006018 A1 Jan. 17, 2002

Related U.S. Application Data

(63) Continuation of application No. 09/663,100, filed on Sep. 15, 2000, which is a continuation of application No. 09/345,651, filed on Jun. 30, 1999, now Pat. No. 6,278,579.

(30) Foreign Application Priority Data

Jul. 1, 1998 (JP) .............................. 10-185915

(51) Int. Cl.[7] ............................... G11B 5/147
(52) U.S. Cl. ....................... 360/126; 360/317
(58) Field of Search .................... 360/317, 126

(56) References Cited

U.S. PATENT DOCUMENTS

| | | | |
|---|---|---|---|
| 5,085,935 A | 2/1992 | Mallary | |
| 5,168,409 A | 12/1992 | Koyama et al. | |
| 5,187,628 A | 2/1993 | Kanai et al. | 360/126 |
| 5,224,002 A | 6/1993 | Nakashima et al. | |
| 5,438,747 A | 8/1995 | Krounbi et al | 29/603 |
| 5,590,008 A | 12/1996 | Tanabe et al. | |
| 5,739,991 A | * 4/1998 | Matono | 360/317 |
| 6,002,555 A | 12/1999 | Tagawa | 360/126 |
| 6,137,652 A | 10/2000 | Ezaki | 360/317 |

FOREIGN PATENT DOCUMENTS

| | | |
|---|---|---|
| EP | 0 401 983 | 12/1990 |
| EP | 0 634 739 A | 1/1995 |
| JP | 10 149513 A | 6/1988 |
| JP | 7296328 A | 11/1995 |
| JP | 07 296 328 | 11/1995 |
| JP | 10 21507 | 1/1998 |

* cited by examiner

Primary Examiner—A. J. Heinz
(74) Attorney, Agent, or Firm—Kenyon & Kenyon

(57) ABSTRACT

An inductive thin-film magnetic head with small fluctuations of the reproduction output and noises for reproduction is disclosed. The forward end of each of a lower magnetic core and an upper magnetic core has the same width as the track. The rear end of each of the lower magnetic core and the upper magnetic core, on the other hand, is wider than the forward end thereof in the direction transverse of the track. Also, the lower magnetic core is formed of at least two magnetic layers with a non-magnetic layer interposed therebetween.

6 Claims, 8 Drawing Sheets

THIN FILM MAGNETIC HEAD INCLUDING A PROTRUSION STRUCTURE AND AN INSULATION FILM IN A MAGNETIC CORE

This is a continuation of application Ser. No. 09/663,100 filed Sep. 15, 2000, which is a continuation of application Ser. No. 09/345,651 filed Jun. 30, 1999, U.S. Pat. No. 6,278,579.

BACKGROUND OF THE INVENTION

The present invention relates to a novel inductive thin-film magnetic head for a dual-element thin-film magnetic head unit including an inductive thin-film magnetic recording head and a magnetoresistive reading head.

With the recording density of a magnetic disk apparatus ever on the increase, magnetic coercive force of the magnetic recording medium is increased while the track width of the inductive thin film magnetic head used for recording is decreasing. Also, the downsizing of the magnetic disk apparatus has reduced the reproduction output of the inductive thin-film magnetic head. For this reason, an inductive thin-film magnetic head is used as a recording head, and a magnetoresistive head is used for converting the leakage magnetic field from the medium as a resistance change. The magneto-resistive head includes a sensor constituted of a magnetoresistive element, a giant magnetoresistive element, a ferromagnetic tunnel junction element, etc., and one of the magnetic shields for improving the spatial resolution is shared with one of the magnetic cores of the inductive thin-film magnetic head.

The current trend of the shape of the magnetic core along the air-bearing surface of an inductive thin-film magnetic head is such that the width of the upper magnetic core determines the track width and the width of the lower magnetic core serving also as the upper shield film of the reproductive head is several tens of times larger than the track width. With the decrease in track width, however, the magnetic field expanding out of the track ends has become conspicuous.

In order to solve this problem, the structure of an inductive thin-film magnetic head with the upper portion of the lower magnetic core of the inductive thin-film magnetic head is shaped to the same width as the upper magnetic core is described in U.S. Pat. No. 5,438,747. Also, the structure of the inductive thin-film magnetic head having a trench including a pole tip layer with the width thereof defining the track width is described in JP-A-7-296328 laid open Nov. 10, 1995 and corresponding to the U.S. patent application Ser. No. 229,484 filed Apr. 19, 1994.

The inductive thin-film magnetic head described in U.S. Pat. No. 5,438,747 (JP-A-7-262519) and JP-A-7-296328 has a protrusion structure having substantially the same width as the track in the neighborhood of the air-bearing surface in the upper portion of the lower magnetic core. This protrusion structure facilitates the machining of the track to a width in the order of submicrons, and the magnetic fields are concentrated in the protrusion structure.

SUMMARY OF THE INVENTION

The prior art described above may develop a magnetic domain wall in the corners of the magnetic material. In the case where the lower magnetic core of the inductive thin-film magnetic head doubles as the upper magnetic shield of the reproductive head, therefore, a domain wall may occur in the portion of the upper magnetic shield extending from the end of protrusion structure to the neighborhood of the sensor portion of the reproductive head. This domain wall is moved by the leakage magnetic field from the medium or the change in the external magnetic field, thereby posing the problem of output changes.

Accordingly, the object of the present invention is to provide a dual-element thin-film magnetic head with small fluctuations of the reproduction output and small reproduction noises.

According to one aspect of the invention, there is provided an inductive thin-film magnetic head comprising a lower magnetic core formed on a substrate, an upper magnetic core arranged in opposed relation to the lower magnetic core with a magnetic gap film therebetween, a coil interposed between the lower magnetic core and the upper magnetic core, and a dielectric layer for insulating the lower magnetic core, the upper magnetic core and the coil from each other, wherein the forward ends of the lower magnetic core and the upper magnetic core have the same width as the track, and the rear ends of the lower magnetic core and the upper magnetic core have a width larger than the width of the forward ends thereof.

According to another aspect of the invention, there is provided an inductive thin-film magnetic head, wherein the lower magnetic core preferably is formed of at least two magnetic layers with a non-magnetic layer therebetween and the forward end of each of the magnetic layers in contact with a magnetic gap has the same width as track.

According to an embodiment of the invention, an inductive thin-film magnetic head comprises a lower magnetic core formed on a substrate, an upper magnetic core having its forward end thereof coupled to the lower magnetic core through a magnetic gap film and its rear end thereof coupled to the lower magnetic core, the forward end being smaller in width than the rear end thereof, the width being made progressively smaller from the rear end toward the forward end thereof, a coil arranged to surround the upper magnetic core and the lower magnetic core, and a dielectric layer formed between the coil, the upper magnetic core and the lower magnetic core, wherein a protrusion structure having the same width as the track is formed at least on the portion of the lower magnetic core in the neighborhood of the air-bearing surface and a non-magnetic layer is formed at least in the neighborhood of the air-bearing surface between the lower magnetic core and the protrusion structure.

Preferably, the thickness of the non-magnetic layer between the lower magnetic core and the protrusion structure is smaller than the thickness of the magnetic gap film, and the saturation magnetic flux density of the protrusion structure is not less than 1.3 T.

According to another embodiment of the invention, the non-magnetic film is held between the lower magnetic core and the protrusion structure formed on the lower magnetic core of an inductive thin-film magnetic head. In this way, the magnetic coupling between the lower magnetic core and the protrusion structure is reduced in order that no domain wall is formed in the neighborhood of the sensor of the reproductive head. The output fluctuations and noises of the reproductive head which otherwise might be caused by the generation, extinction and relocation of the domain wall can be reduced.

The non-magnetic film between the lower magnetic core and the protrusion structure of the inductive thin-film magnetic head should be sufficiently thin to reduce the magnetic coupling between them to such an extent as not to form any domain wall in the neighborhood of the sensor of the reproductive head of the lower magnetic core. In the case where the non-magnetic film is thicker than the gap film, the non-magnetic film would function also as a gap, with a result that the recording magnetic field would be made wider with its intensity being made correspondingly smaller.

DESCRIPTION OF THE PREFERRED EMBODIMENTS (Embodiment 1)

Figure 1:
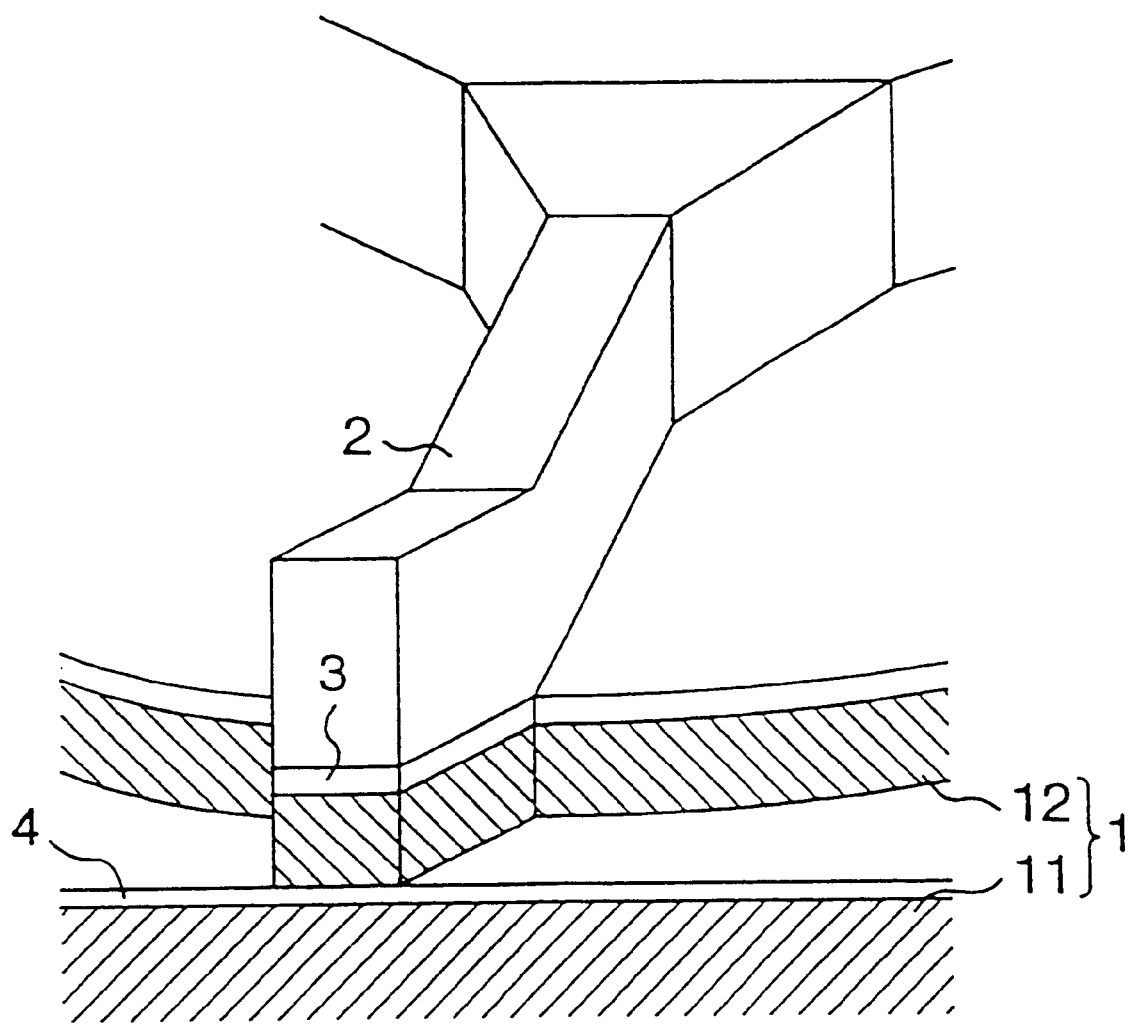
FIG. 1 is a perspective view of the forward end of an inductive thin-film magnetic head according to an embodiment of the present invention.

FIG. 1 is a perspective view of the portion of the inductive thin-film magnetic head in the neighborhood of the air-bearing surface according to an embodiment of the present invention. A non-magnetic film 4, an upper layer 12 of a lower magnetic core and a magnetic gap film 3 are formed in that order on a lower layer 11 of the lower magnetic core. Then, a coil and a dielectric layer to surround the lower magnetic core 1 and the upper magnetic core 2 are formed. After that, the upper magnetic core 2 is formed. Last of all, the forward end of the upper layer 12 of the lower magnetic core is formed to the desired shape by ion milling or the like using an appropriate mask and the upper magnetic core 2. A magnetic core of similar shape can be obtained also by forming the forward ends of the upper magnetic core 2 and the upper layer 12 of the lower magnetic core simultaneously by the focused ion beam process.

As shown in FIG. 1, the forward ends of the lower magnetic core and the upper magnetic core both have the same width as the track, whereas the rear ends of the lower magnetic core and the upper magnetic core have a larger width than the forward ends thereof in the direction transverse of the track.

Further, the lower magnetic core has two magnetic layers through a non-magnetic layer there-between, and the forward end thereof in contact with the magnetic gap has substantially the same width as the track.

The portion of the lower magnetic core in the neighborhood of the air-bearing surface has a protrusion structure of substantially the same width as the track, and at least the portion between the lower magnetic core and the protrusion structure in the neighborhood of the air-bearing surface has the non-magnetic layer.

Figure 2A:
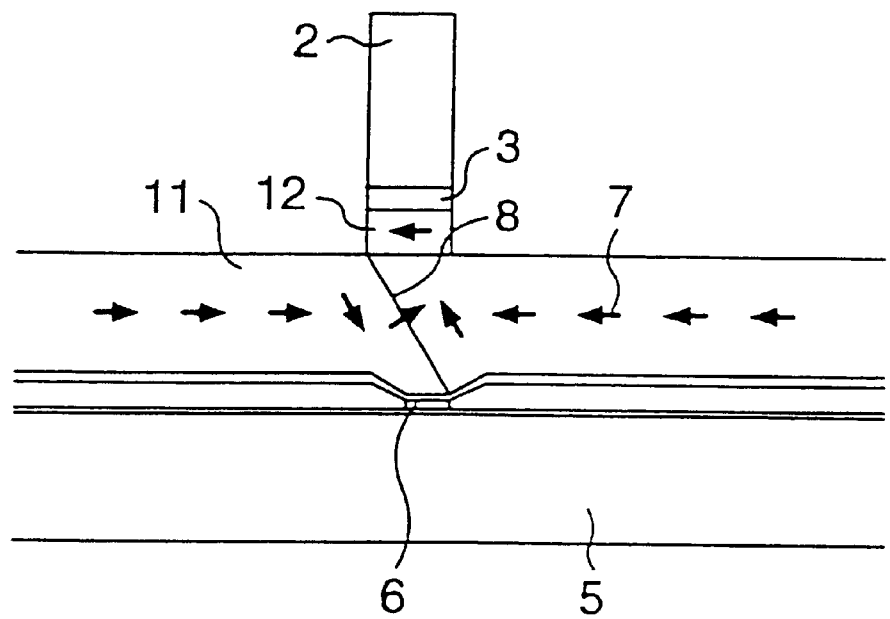
FIGS. 2a, 2b are diagrams showing the manner in which the lower magnetic core of the inductive thin-film magnetic head is magnetized.
Figure 2B:
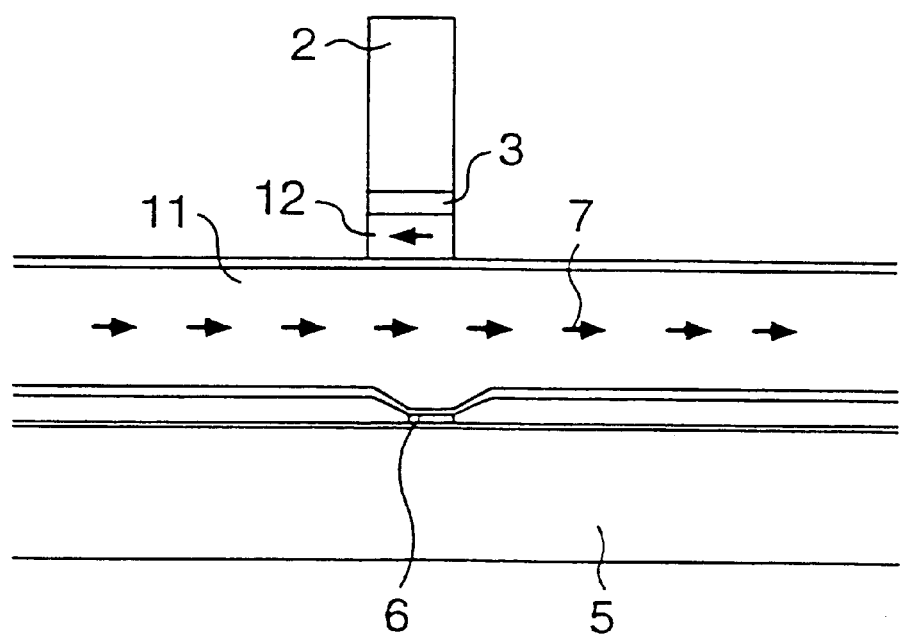

FIGS. 2a, 2b are diagrams showing the magnetic domain structure of the lower magnetic core of the inductive thin-film magnetic head. This magnetic domain structure is an example of the result observed using the spin-polarized SEM. Arrows 7 indicate the direction of magnetization. FIG. 2a shows the magnetic domain structure with a non-magnetic film not formed between the upper layer 12 of the lower magnetic core and the lower layer 11 of the lower magnetic core, and FIG. 2b shows the magnetic domain structure with a non-magnetic film formed between the upper layer 12 of the lower magnetic core and the lower layer 11 of the lower magnetic core. In the absence of the non-magnetic film between the upper layer 12 of the lower magnetic core and the lower layer 11 of the lower magnetic core, a domain wall 8 is liable to occur between the step on a magnetoresistive element 6 and an end of the contact portion between the upper layer 12 of the lower magnetic core and the lower layer 11 of the lower magnetic core. The magnetization changes so that the domain wall 8 occurs, disappears or moves before and after recording or with the change in the external magnetic field. The domain wall 8, which is at a 180° domain wall in FIG. 2a, may be a 90° domain wall depending on the magnetization. This domain wall 8 and the change in the direction 7 of magnetization cause the output fluctuations and noises of the magnetoresistive element 6. The domain wall is liable to be formed at the tip of the forward end of the upper layer 12 of the lower magnetic core and the step of a magnetic material by reason of the fact that a magnetic pole is generated in the end portion and the step of the magnetic material.

As shown in FIG. 2b, a non-magnetic film 4 is held between the lower layer 11 of the lower magnetic core and the upper layer 12 of the lower magnetic core thereby to reduce the magnetic coupling between the lower layer 11 of the lower magnetic core and the upper layer 12 of the lower magnetic core. In this way, the lower layer 11 of the lower magnetic core forms a substantially single magnetic domain. In this case, the thickness of the magnetic gap film 3 is set to 0.3 $\mu$m and the thickness of the non-magnetic film 4 is set to 50 nm.

Figure 3A:
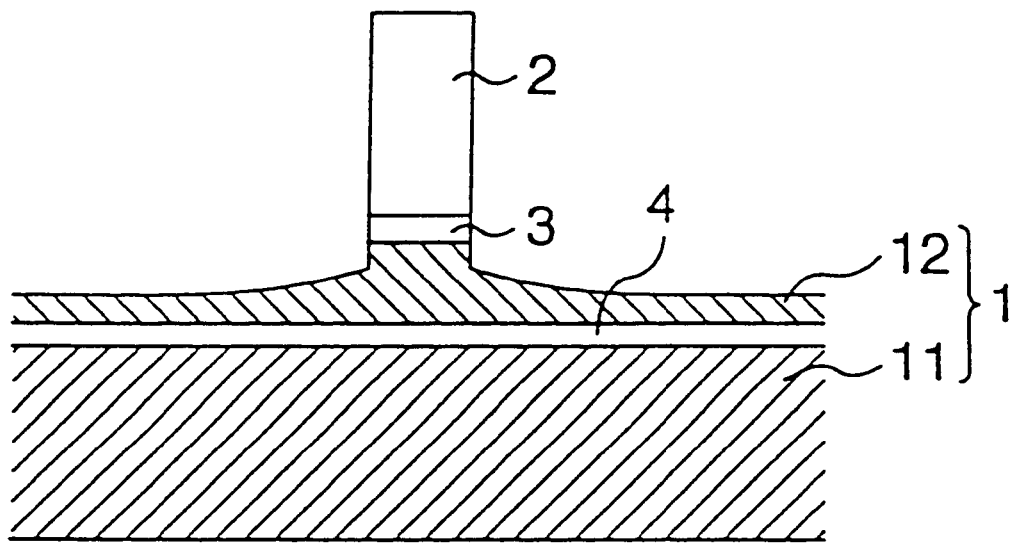
FIGS. 3a, 3b are diagrams showing the shape of the air-bearing surface of the inductive thin-film magnetic head according to an embodiment of the invention.
Figure 3B:
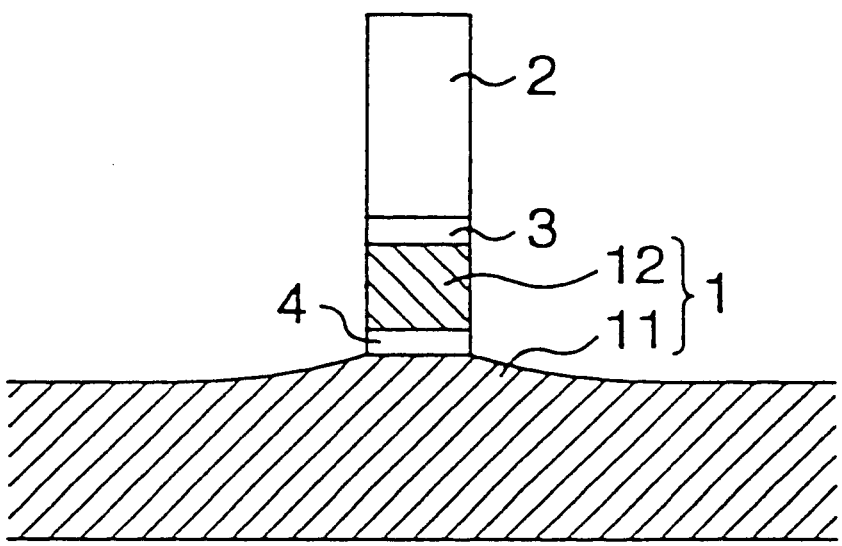

FIGS. 3a, 3b are diagrams showing the shape of the air-bearing surface of the inductive thin-film magnetic head according to an embodiment of the invention.

FIG. 3a shows the state in which the upper layer 12 of the lower magnetic core has not been cut for a sufficiently long time so that the upper layer 12 of the lower magnetic core still remains on the non-magnetic film 4 other than the track area. In this case, the non-magnetic film 4 between the upper layer 12 of the lower magnetic core and the lower layer 11 of the lower magnetic core reduces the magnetic coupling between them. Therefore, the possibility is very low of a domain wall being generated in the portion of the lower layer 11 of the lower magnetic core in the neighborhood of the track, but the possibility is high of a leakage magnetic field increasing from the track end in the direction transverse of the track. For the leakage magnetic field to be reduced in the direction transverse of the track, the cutting depth of the upper layer 12 of the lower magnetic core is required to be not less than 0.3 $\mu$m.

FIG. 3b shows the case in which the cutting time is sufficiently long so that even the surface of the lower layer 11 of the lower magnetic core is cut. In the case where the surface of the lower layer 11 of the lower magnetic core changes in a curve as gentle as shown in FIG. 3b, no problem is posed as the domain wall is not easily formed in the portion of the lower layer 11 of the lower magnetic core in the neighborhood of the track. Once a step is formed by cutting the lower layer 11 of the lower magnetic core further, however, a domain wall is liable to be generated from the particular point.

To further suppress the generation of a domain wall, the lower layer 11 of the lower magnetic core may be formed of a magnetic multilayer film having an alternate multilayer arrangement of magnetic films and non-magnetic films.

Figure 4A:
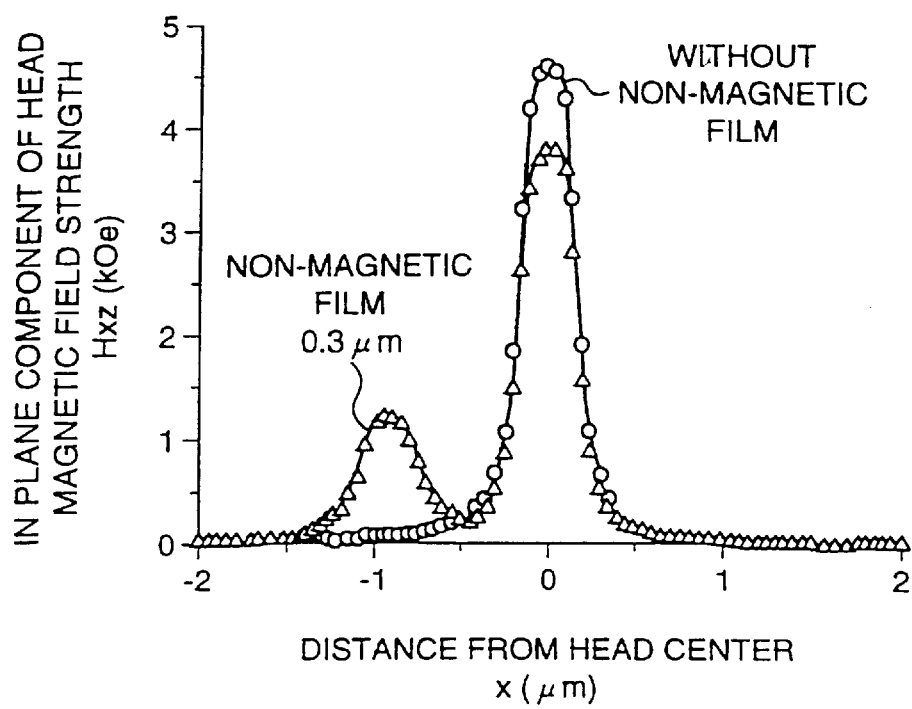
FIGS. 4a, 4b are diagrams showing the in-plane component of the magnetic field strength of the inductive thin-film magnetic head according to an embodiment of the invention.
Figure 4B:
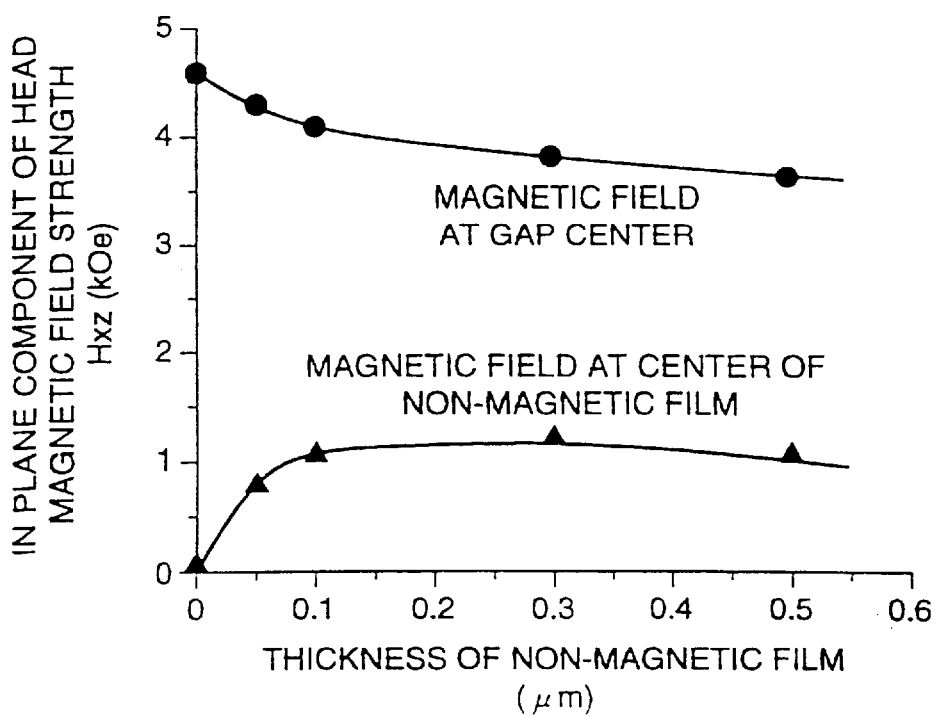

FIGS. 4a, 4b show the in-plane component of the magnetic field strength of an inductive thin-film magnetic head calculated by the integral element method according to an embodiment of the invention. The magnetic cores are configured as shown in FIG. 1. Assuming that the lower magnetic core 1 is 120 μm wide and made of a permalloy containing 80% Ni and 20% Fe, the saturated magnetic flux density Bs is set to 1 T and the initial permeability μ to 2500. Also, the thickness of the lower layer 11 of the lower magnetic core is set to 2.4 μm and the thickness of the upper layer 12 of the lower magnetic core is set to 0.6 μm. The thickness of the magnetic gap film 3 is set to 0.3 μm, the track width to 1.2 μm, and the width of the rear end of the upper magnetic core 2 to 100 μm. Also, assuming that the upper magnetic core 2 is 4 μm thick and made of an alloy containing 46% Ni and 54% Fe, the saturated magnetic flux density Bs is set to 1.7 T and the initial permeability μ to 1700. The magnetomotive force is set to 0.5 AT, and the magnetic field strength is measured at a point 70 nm away from the air-bearing surface of the inductive thin-film magnetic head.

FIG. 4a is a diagram showing the change of the magnetic field toward the track on the center line of the inductive thin-film magnetic head. Circles indicate the case in which the non-magnetic film is not formed between the lower layer 11 of the lower magnetic core and the upper layer 12 of the lower magnetic core, and triangles indicate the case in which the thickness of the non-magnetic film 4 is 0.3 μm. The negative side along the abscissa corresponds to the lower magnetic core 1, and in the case where the thickness of the non-magnetic film 4 is 0.3 μm, the position indicated by x=−0.9 μm corresponds to the center of the non-magnetic film 4. In the presence of the non-magnetic film 4, the central magnetic field is decreased while the magnetic field in the neighborhood of the non-magnetic film 4 is increased.

FIG. 4b is a diagram showing the magnetic field at the center of the gap and the magnetic field at the center of the non-magnetic film as summarized with respect to the thickness of the non-magnetic film 4. The magnetic field at the center of the gap decreases with the increase in the thickness of the non-magnetic film, and the magnetic field at the center of the non-magnetic film 4, which increases with the thickness the non-magnetic film 4 until the latter reaches 0.3 μm, decreases subsequently. This indicates that the magnetic field at the center of the non-magnetic film increases with the thickness of the non-magnetic film until the latter reaches the thickness of the magnetic gap film 3, after which the magnetic field decreases. Desirably, the magnetic field at the center of the gap is high and the magnetic field at the center of the non-magnetic film is low. In other words, the thickness of the non-magnetic film 4 is desirably not more than the thickness of the magnetic gap film 3, and the thickness of the non-magnetic film 4 is desirably not more than one third of the thickness of the magnetic gap film 3.

(Embodiment 2)

Figure 5:
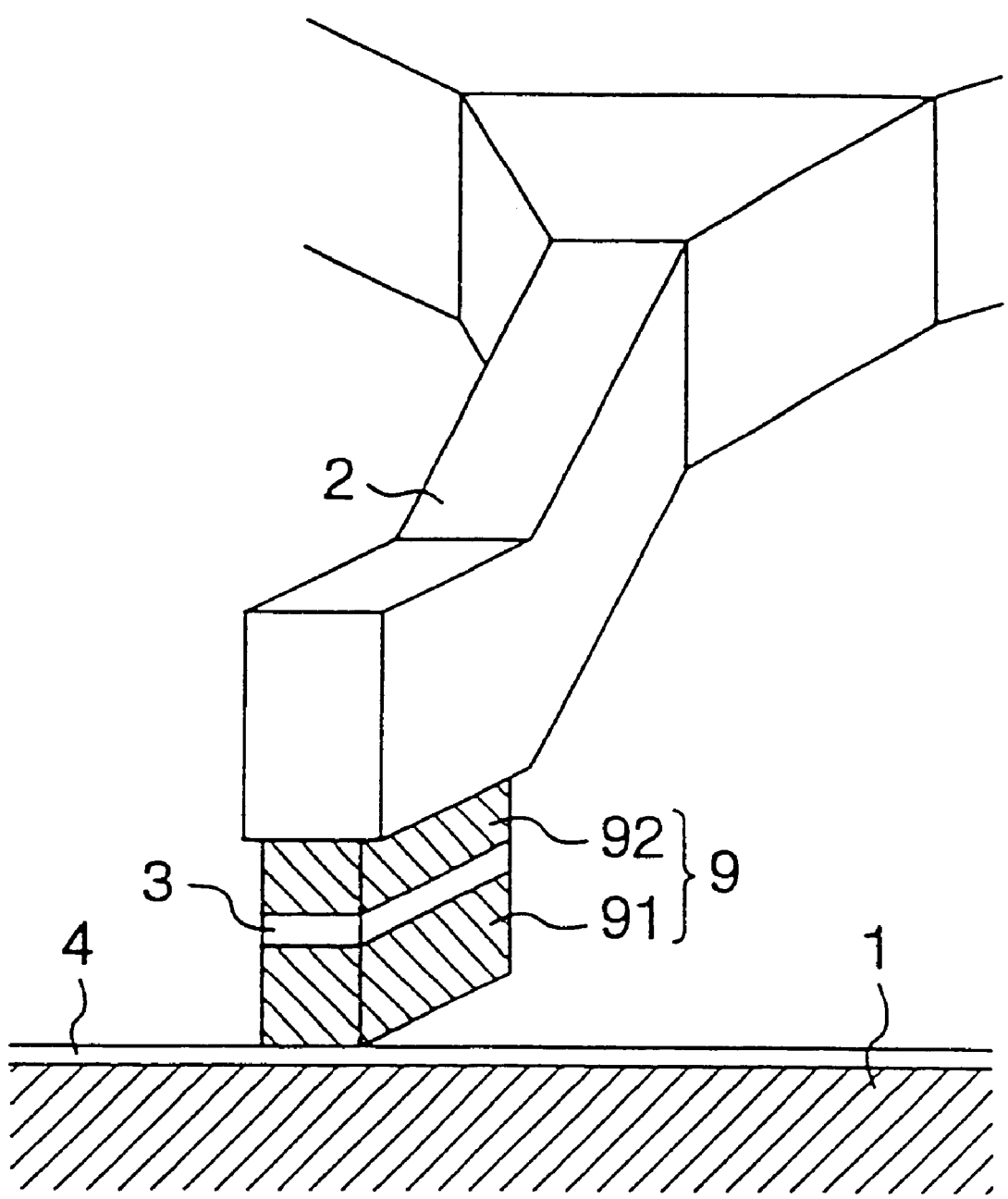
FIG. 5 is a perspective view of the forward end of the inductive thin-film magnetic head according to an embodiment of the invention.

FIG. 5 shows an inductive thin-film magnetic head according to another embodiment of the invention. FIG. 5 is a perspective view of the portion of the inductive thin-film magnetic head in the neighborhood of the air-bearing surface thereof. The non-magnetic film 4 is formed on the lower magnetic core 1, after which the lower layer 91 of the pole tip element, the magnetic gap film 3 and the upper layer 92 of the pole tip element are formed in that order. Then, a coil to surround the lower magnetic core 1 and the upper magnetic core 2 and a dielectric layer are formed, followed by forming the upper magnetic core 2. In the absence of the non-magnetic film 4, a domain wall is liable to occur in the lower magnetic core 1 from the end of the pole tip element 9. The provision of the non-magnetic film 4 between the lower magnetic core 1 and the pole tip element 9 as in this invention makes it difficult for a domain wall to form in the lower magnetic core 1. According to this embodiment, the pole tip element 9 includes the lower layer 91, the magnetic gap film 3 and the upper layer 92. A similar effect can be produced also in the absence of the upper layer 92 of the pole tip element.

(Embodiment 3)

Figure 6:
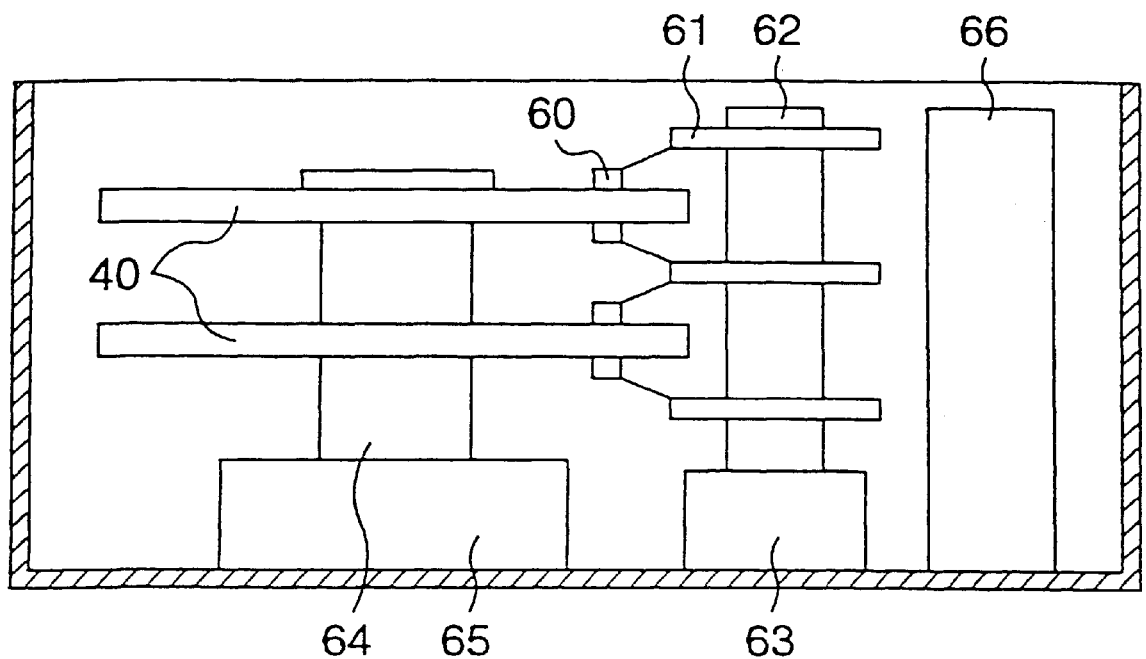
FIG. 6 is a schematic diagram showing a hard disk device according to an embodiment of the invention.

FIG. 6 is a schematic diagram showing a hard disk device using an inductive thin-film magnetic head and a magnetoresistive reproductive head of the spin valve head according to the first and second embodiments. This device includes a disk rotative shaft 64 and a spindle motor 65 for rotating the shaft 64 at a high speed. The disk rotative shaft 64 has mounted thereon one or a plurality (two in this embodiment) of disks 40 arranged at predetermined intervals. Thus each disk 40 rotates integrally with the disk rotative shaft 64. The disk 40 is a circular plate having a predetermined radius and a predetermined thickness and formed with a permanent magnet film on both sides thereof constituting information recording surfaces. This device also includes a head positioning rotative shaft 62 and a voice coil motor 63 for driving the rotative shaft 62 on the exterior thereof, and a plurality of access arms 61 are mounted on the head positioning rotative shaft 62. A recording/reproductive head (hereinafter referred to simply as the head) 60 is mounted at the forward end of each access arm 61. As a result, each head 60 is moved in radial direction on each disk 40 with the rotation of the head positioning rotative shaft 62 by a predetermined angle, and set in position. Also, each head 60 is held at a point several tens of nm from the surface of the disk 40 under the balance between the buoyancy caused by the high-speed rotation of the disk 40 and the pressure of the gimbal constituting an elastic member of the access arm 61. The spindle motor 65 and the voice coil motor 63 are connected to a hard disk controller 66, respectively, whereby the rotative speed of the disk 40 and the position of the head 60 are controlled.

Figure 7:
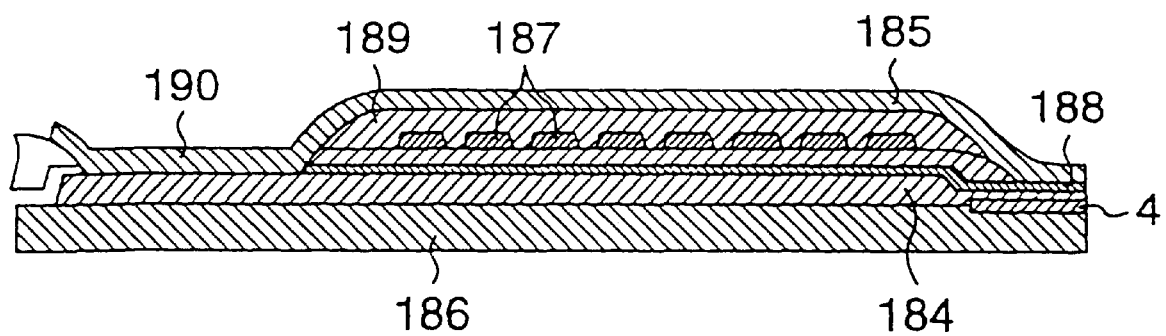
FIG. 7 is a sectional view of an inductive magnetic recording head according to an embodiment of the invention.

FIG. 7 is a sectional view schematically showing the inductive recording head explained in the first and second embodiments and used with the hard disk device according to an embodiment of the invention. This thin-film head includes an upper shield film 186, a lower magnetic core 184 made of a magnetic film attached thereon, a dielectric film 4 for isolating the upper shield film 186 and the lower magnetic core 184 from each other, and an upper magnetic core 185. A non-magnetic dielectric member 189 is attached between these magnetic films. A part of the dielectric member defines the magnetic gap 188. The support member is in the shape of slider having an air-bearing surface (ABS) and is adapted to be airborne in proximity to the disk medium rotating during the disk file operation. The forward ends of the lower magnetic core 184 and the upper magnetic core 185 are similar in detail to those in FIGS. 1 and 5.

The thin-film magnetic head has a back contact 190 formed by the upper magnetic film 185 and the lower magnetic film 184.

According to an embodiment of the invention, each coil 187 made of a single layer is in the shape of a slightly deformed ellipse, of which the portion having a smaller sectional area is arranged nearest to the magnetic gap with the sectional area progressively increasing with the distance from the magnetic gap.

A multiplicity of the elliptical coils are inserted with a comparatively high density between the back gap 190 and the magnetic gap 188. In this area, the width and the section diameter of the coils are small. Further, the elliptical (flat oval) coils have no sharp corner or edge or end and are small in current resistance. Also, an elliptical coil, as compared with a rectangular or circular (annular) coil, can have a short total length of the conductor. These advantages lead to a comparatively small resistance, small heat generation and an appropriate degree of heat radiation of the coils as a whole. Since a considerable amount of heat is reduced, the deformation, elongation and expansion of the thin-film layer are prevented thereby to eliminate the causes of the pole tip protrusion in the ABS.

The elliptical coil having a substantially uniform width can be attached by the conventional plating technique inexpensive as compared with the sputtering or vapor deposition. A coil having other shapes, or especially those having a sharp corner are liable to lack a uniform width when attached by plating. By eliminating corners and sharp edges, it is possible to prevent the coil products from being subjected to a large mechanical stress.

According to this embodiment, a multiplicity of turns of substantially elliptical coils are formed between the magnetic cores, and the diameter of the coil section progressively increases from the magnetic gap toward the back gap, thereby reducing the heat generation.

Figure 8:
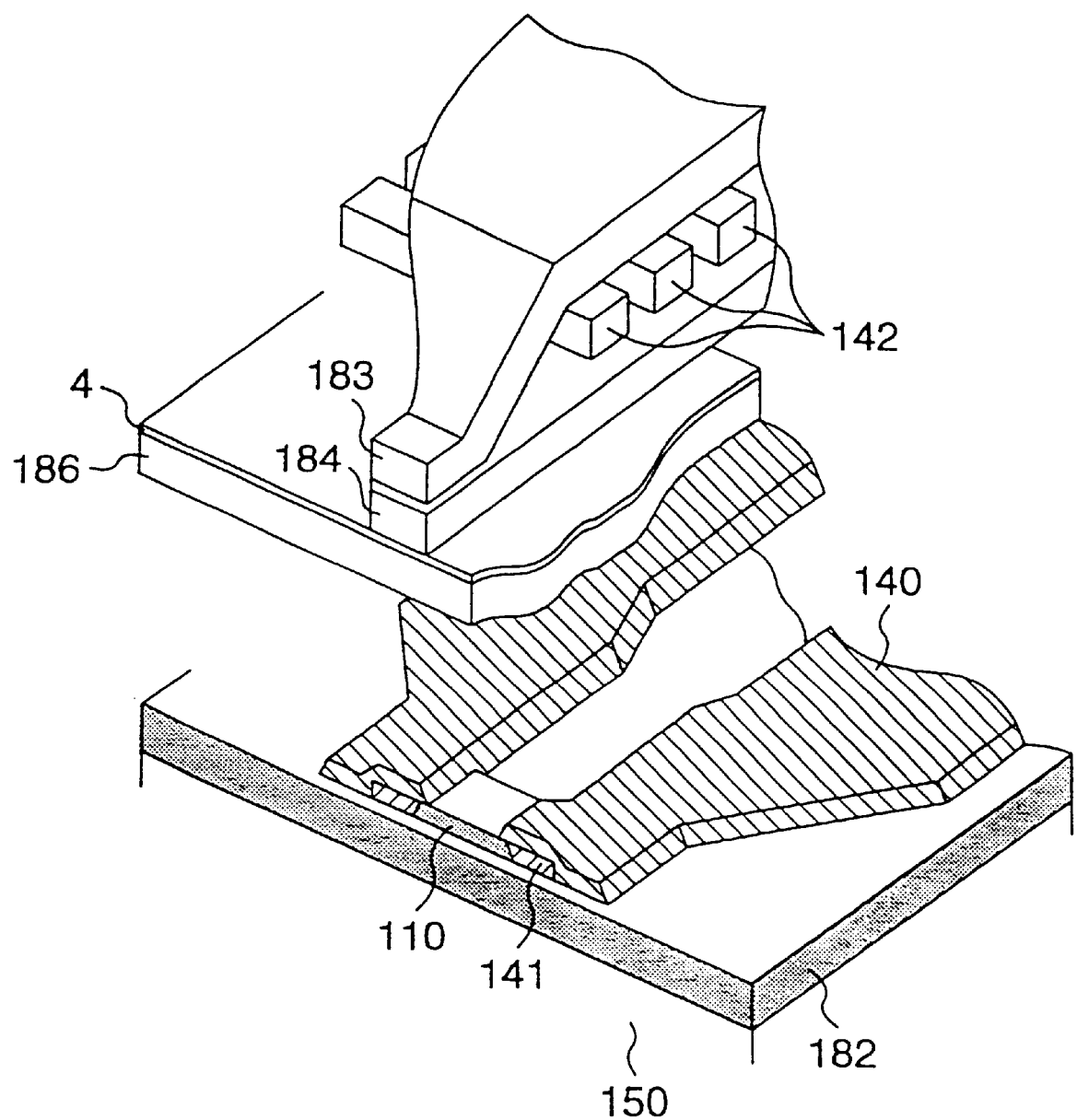
FIG. 8 is a perspective view showing a part of a magnetic head comprising an inductive magnetic recording head and a magnetoresistive reproductive head integrated with each other according to an embodiment of the invention.

FIG. 8 is a perspective view schematically showing a magnetic head having an inductive recording head and a magnetoresistive reproductive head according to an embodiment of the invention. A substrate 150 doubling as a head slider is formed with a reproductive head including a lower shield 182, a magnetoresistive film 110, a magnetic domain control film 141 and an electrode terminal 140, a lower layer 186 of the lower magnetic film, a non-magnetic film 4, an upper layer 184 of the lower magnetic film and an upper magnetic film 183. The lower gap and the upper gap are not shown. The coils 142 generates a magnetomotive force in the lower core doubling as the upper shield and the upper magnetic core by the electromagnetic induction, thereby constituting an inductive recording head.

Figure 9:
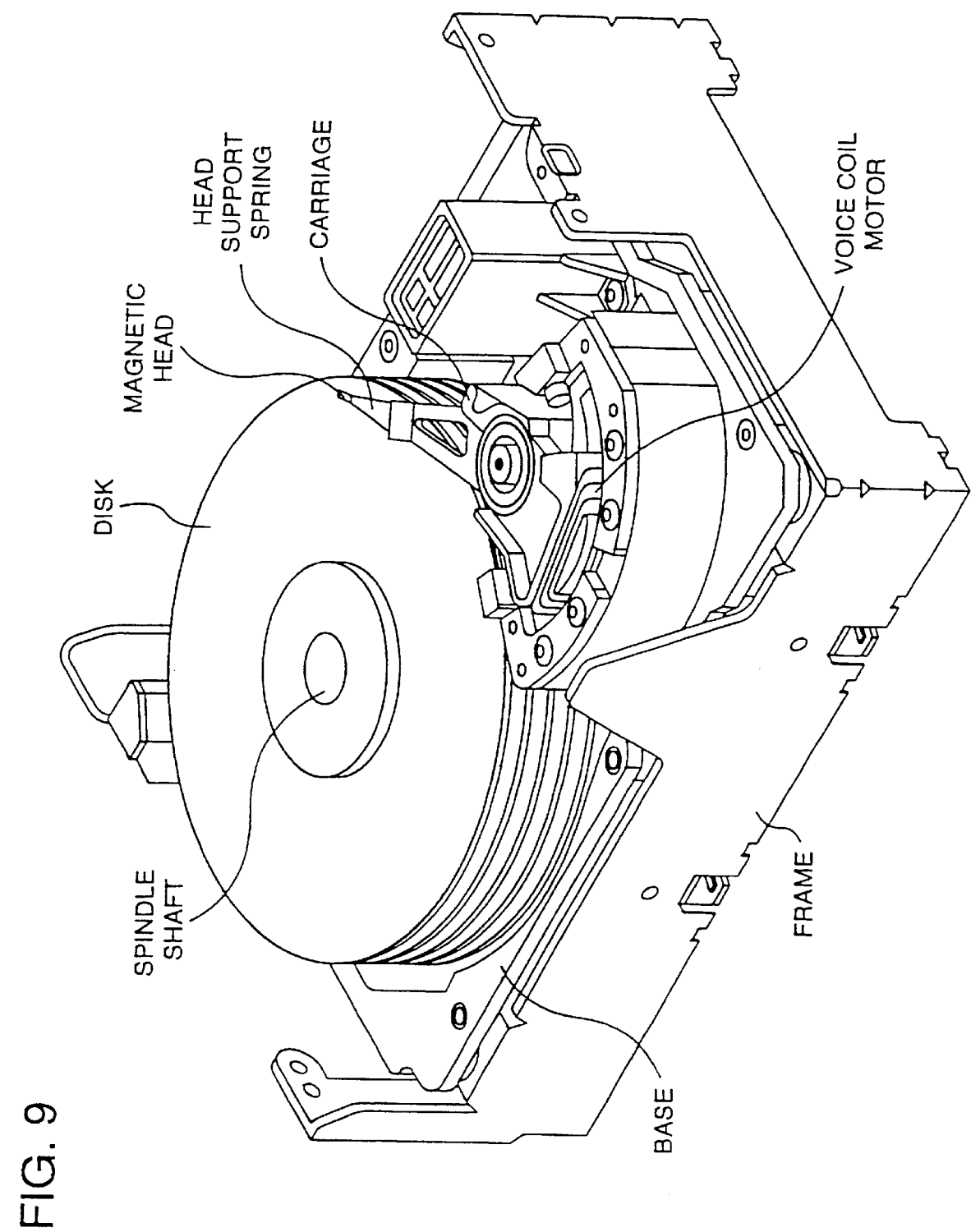
FIG. 9 is a general view of a magnetic disk device according to an embodiment of the invention.

FIG. 9 is a perspective view showing the whole of a magnetic disk device according to an embodiment of the invention. This magnetic disk device comprises a magnetic disk for recording information, a DC motor (not shown) providing means for rotating the magnetic disk, a magnetic head for writing and reading information, a positioning unit providing means for supporting and changing the position of the magnetic head relative to the magnetic disk, i.e. an actuator and a voice coil motor. FIG. 9 shows the case in which five magnetic disks are mounted on the same rotative shaft thereby to increase the total storage capacity.

It will thus be understood from the foregoing description that according to the above-mentioned embodiments of the invention, a dual-element (thin-film magnetic) head with a reading magnetoresistive (thin-film magnetic) element with small fluctuations in output signal and reduced noises is obtained.

What is claimed is:

1. A thin film magnetic head comprising:
   a lower magnetic shield film,
   a lower magnetic core formed above said lower magnetic shield film,
   a magnetoresistive film disposed between said lower magnetic shield film and said lower magnetic core,
   a pair of electrodes disposed at either side of said magnetoresistive film,
   an upper magnetic core formed above said lower magnetic core, and
   a gap film formed between said lower magnetic core and said upper magnetic core, wherein:
   said lower magnetic core comprising:
      a lower magnetic film,
      a non-magnetic film substantially covering an entire upper surface of said lower magnetic film including an air bearing surface, and
      an upper magnetic film formed over said non-magnetic film.

2. A thin film magnetic head according to claim 1, wherein:
   a length of a portion of said upper magnetic film facing to said gap film, which is measured in a track width direction, is substantially equal to a length of the portion of said upper magnetic core facing to said gap film, which is measured in a track width direction.

3. A thin film magnetic head comprising:
   a lower magnetic shield film,
   a lower magnetic film formed above said lower magnetic shield film,
   a magnetoresistive film disposed between said lower magnetic shield film and said lower magnetic film,
   a pair of electrodes disposed at either side of said magnetoresistive film,
   an upper magnetic film formed above said lower magnetic film,
   a gap film formed between said lower magnetic film and said upper magnetic film, wherein
   said lower magnetic film comprising:
      a lower magnetic layer,
      a non-magnetic film substantially covering an entire upper surface of said lower magnetic layer including an air bearing surface, and
      an upper magnetic layer formed over said non-magnetic film.

4. A thin film magnetic head according to claim 3, wherein:
   a length of a portion of said upper layer of the lower magnetic film facing to the gap film, which is measured in a track width direction, is substantially equal to a length of a portion of said upper magnetic film facing to said gap film, which is measured in a track width direction, at least at an air bearing surface.

5. A thin film magnetic head according to claim 3, wherein:
   said upper layer of the lower magnetic film is shaped by cutting in the perpendicular direction against said lower magnetic film, and
   the cutting depth is not less than 0.3 μm at least at an air bearing surface.

6. A thin film magnetic head comprising:
   a lower magnetic shield film,
   a lower magnetic film formed above said lower magnetic shield film,
   a magnetoresistive film disposed between said lower magnetic shield film and said lower magnetic film,
   a pair of electrodes disposed at either side of said magnetoresistive film,
   an upper magnetic film formed above said lower magnetic film, and
   a gap film formed between said lower magnetic film and said upper magnetic film, wherein:
   said lower magnetic film comprising:
      a lower magnetic layer,
      a non-magnetic film substantially covering an entire upper surface of said lower magnetic layer including an air bearing surface, and
      an upper magnetic layer with a protrusion structure facing to said upper magnetic film at the air bearing surface.

* * * * *